United States Patent [19]

Wu et al.

[11] Patent Number: 5,659,715

[45] Date of Patent: Aug. 19, 1997

[54] METHOD AND APPARATUS FOR ALLOCATING DISPLAY MEMORY AND MAIN MEMORY EMPLOYING ACCESS REQUEST ARBITRATION AND BUFFER CONTROL

[75] Inventors: Shih-Ho Wu, Mesa; William Desi Rhoden; Mike Nakahara, both of Phoenix, all of Ariz.

[73] Assignee: VLSI Technology, Inc., San Jose, Calif.

[21] Appl. No.: 646,555

[22] Filed: May 8, 1996

Related U.S. Application Data

[63] Continuation of Ser. No. 158,979, Nov. 30, 1993, abandoned.

[51] Int. Cl.⁶ .................................................. G06F 12/00
[52] U.S. Cl. ........................................ 395/497.01; 345/185
[58] Field of Search ........................... 395/497.01–497.04, 395/165, 164, 166; 345/185, 202, 201

[56] References Cited

U.S. PATENT DOCUMENTS

| | | | |
|---|---|---|---|
| 4,028,663 | 6/1977 | Royer et al. | 395/478 |
| 4,277,836 | 7/1981 | Kawakami | 365/230.03 |
| 4,608,632 | 8/1986 | Kummer | 395/401 |
| 4,910,687 | 3/1990 | Butler et al. | 345/191 |
| 4,953,101 | 8/1990 | Kellejer et al. | 395/505 |
| 4,980,828 | 12/1990 | Kapcio et al. | 364/413.13 |
| 5,081,699 | 1/1992 | Filion et al. | 395/787 |
| 5,117,243 | 5/1992 | Swanberg et al. | 347/254 |
| 5,126,910 | 6/1992 | Windsor et al. | 361/42 |
| 5,157,774 | 10/1992 | Culley | 395/466 |
| 5,165,103 | 11/1992 | Takeda et al. | 382/305 |
| 5,229,758 | 7/1993 | Hsu | 345/27 |
| 5,265,218 | 11/1993 | Testa et al. | 395/280 |
| 5,276,848 | 1/1994 | Gallagher et al. | 395/448 |
| 5,276,851 | 1/1994 | Thacker et al. | 395/447 |
| 5,291,604 | 3/1994 | Kardach et al. | 395/734 |
| 5,293,483 | 3/1994 | Mizobata | 395/508 |
| 5,335,322 | 8/1994 | Mattison | 395/511 |
| 5,357,628 | 10/1994 | Yuen | 395/183.81 |
| 5,361,387 | 11/1994 | Millar et al. | 395/511 |
| 5,376,949 | 12/1994 | Haigh et al. | 345/196 |
| 5,384,900 | 1/1995 | Sato et al. | 395/515 |

FOREIGN PATENT DOCUMENTS

0 217 479  4/1987  European Pat. Off. .

OTHER PUBLICATIONS

Mills, Robert, High–End Graphics Boards, Computer–Aided Engineering, v10, n9, p. 58(4), Sep. 1991.
McCarron, *Graphics Introductions Accelerate*, Microprocessor Report, v7, n9, p. 1(6), Jul. 12, 1993.
Weiss, *Graphics Processor Strips Down for X–Window*, EDN, v37, n13, p. 82(2), Jun. 18, 1992.
Ross, *Compaq Adopts Upgradable Design, Aggressive Stance*, PC Magazine, v10, n18, p. 35(3), Oct. 29, 1991.
Linley Gwennap, "Alph Hits Low End with Digital's 21066", Sep. 13, 1993, Microprocessor Report, vol. 7, No. 12. pp. 1, 6–8, and 16.
"Chips" 64200 Wingine Product Brochure, Jul. 1992. pp. 5–11, 96, and 97.
Pastrick, QMAPS, PC Magazine, v11, n3, p. 254(2) Feb. 11, 1992.

*Primary Examiner*—Matthew M. Kim
*Attorney, Agent, or Firm*—Burns, Doane, Swecker & Mathis

[57] ABSTRACT

A low-cost, moderate performance small computer system is provided by allowing a single sharable block of memory to be independently accessible as graphics or main store memory. Allocation of the memory is selected programmably, eliminating the need to have the maximum memory size for each block simultaneously. Performance penalties are minimized by dynamically allocating the memory bandwidth on demand rather than through fixed time slices. A reallocatable memory subsystem enables transparent transfer of memory function of a lower-performance memory such as DRAM to occur in conjunction with a memory upgrade to a higher-performance memory such as VRAM, for example.

6 Claims, 6 Drawing Sheets

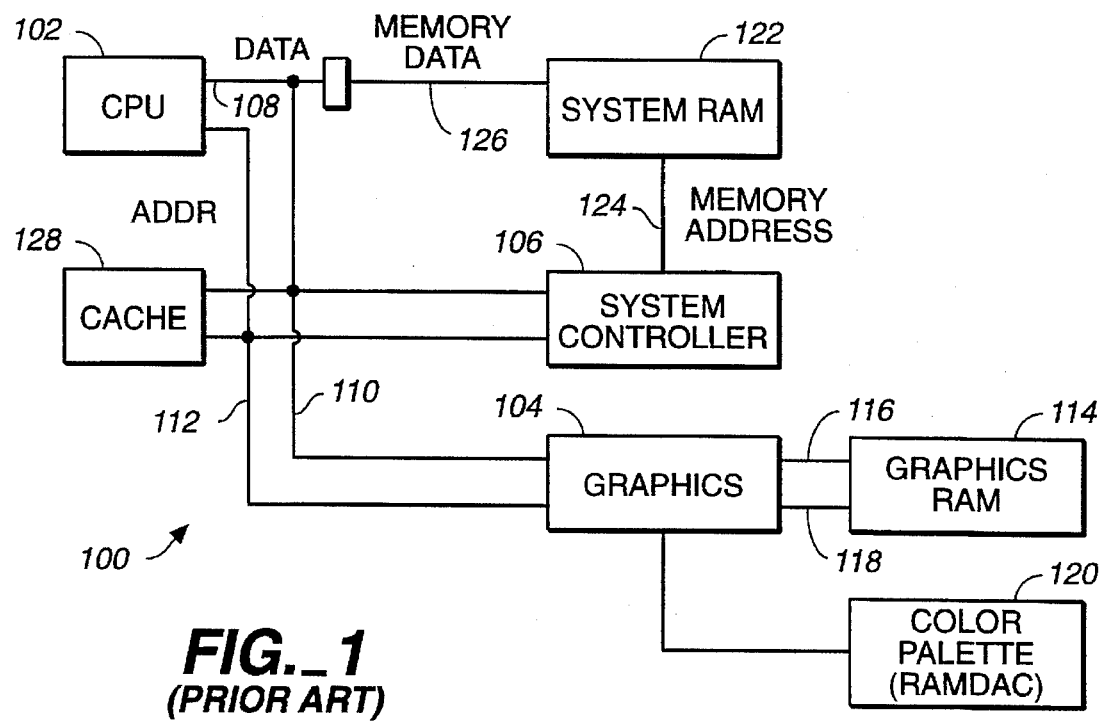
FIG._1
(PRIOR ART)
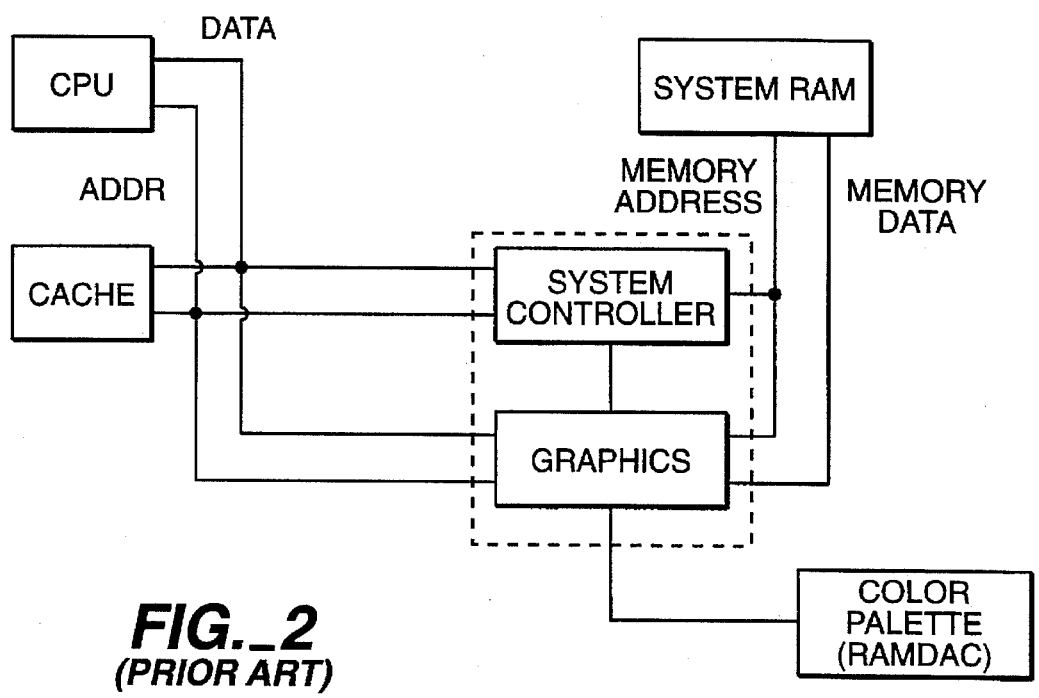
FIG._2
(PRIOR ART)

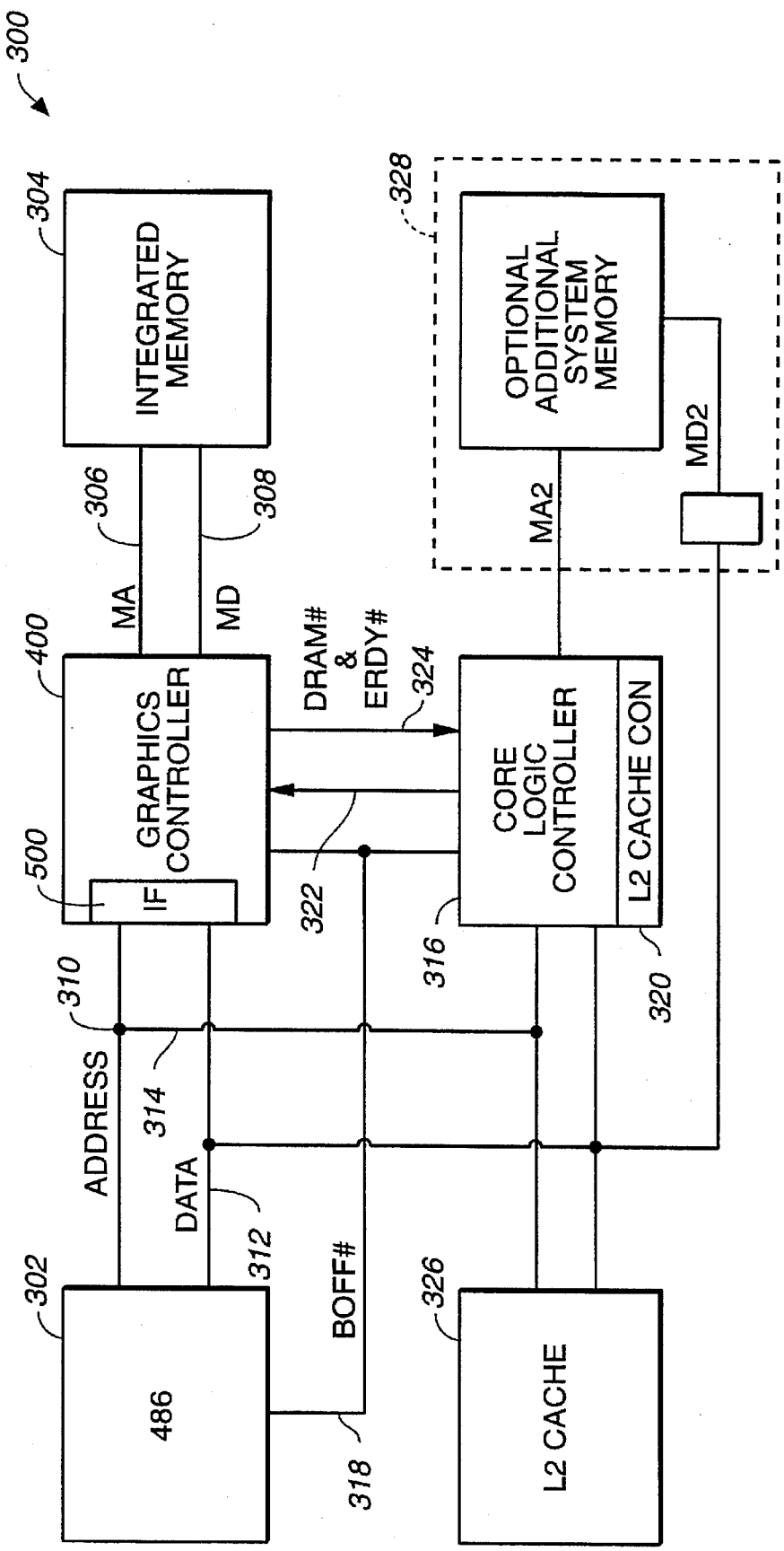
FIG._3

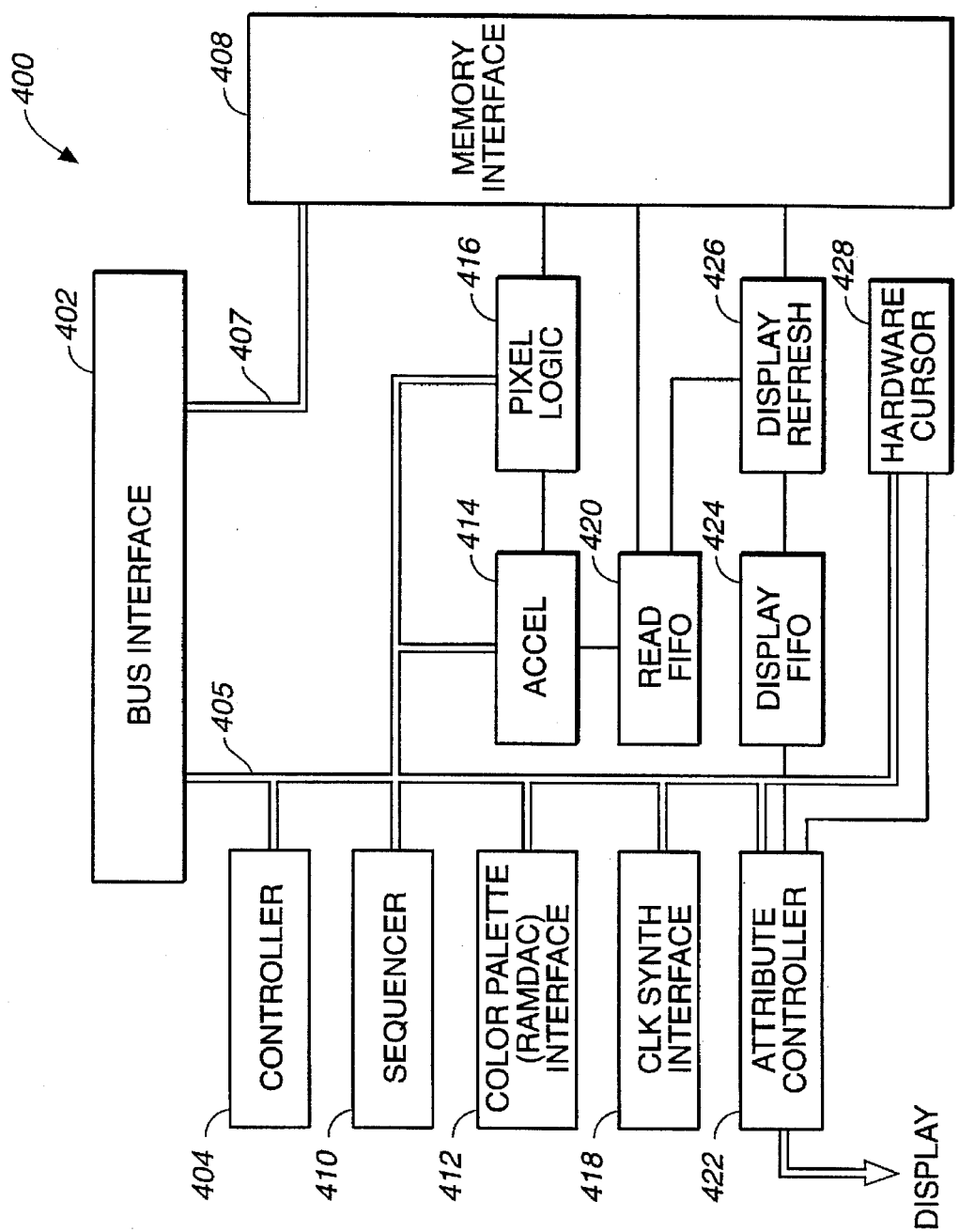
FIG._4

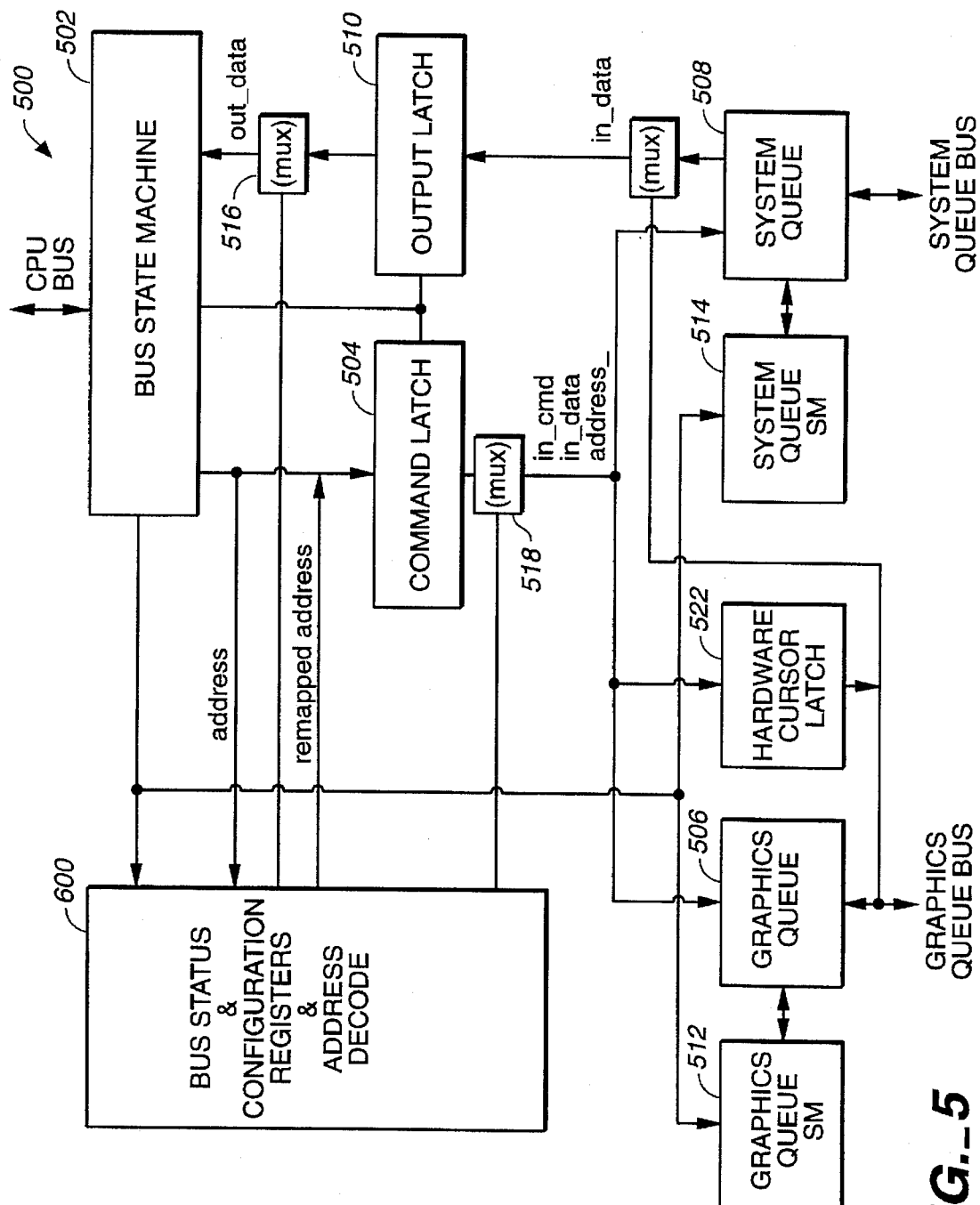
FIG._5

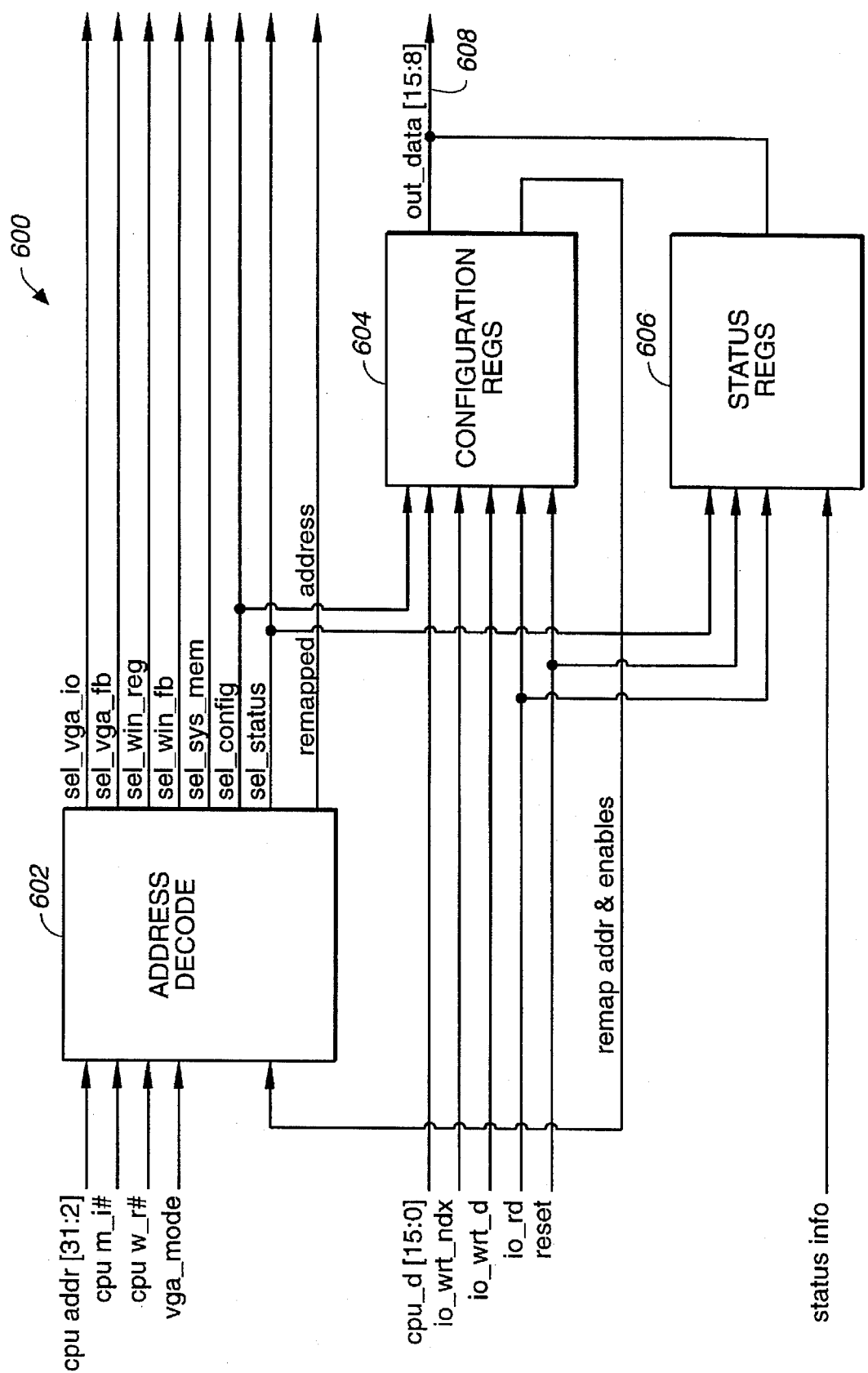
FIG._6

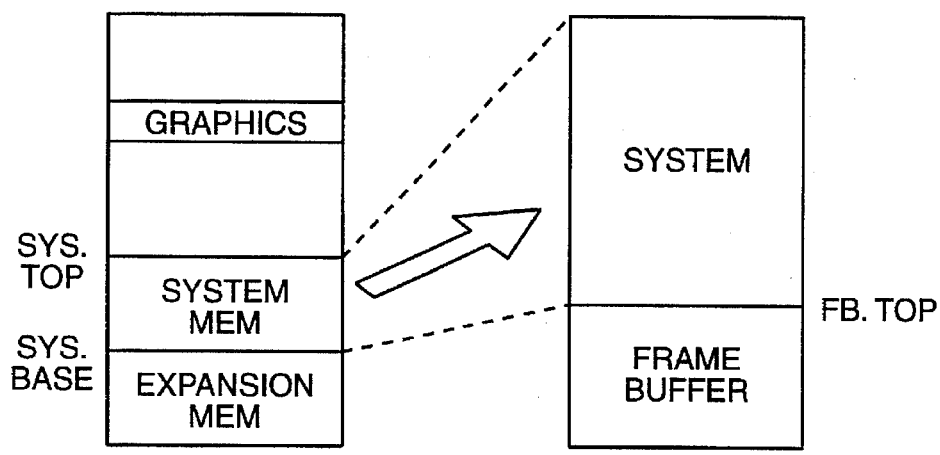
FIG._7
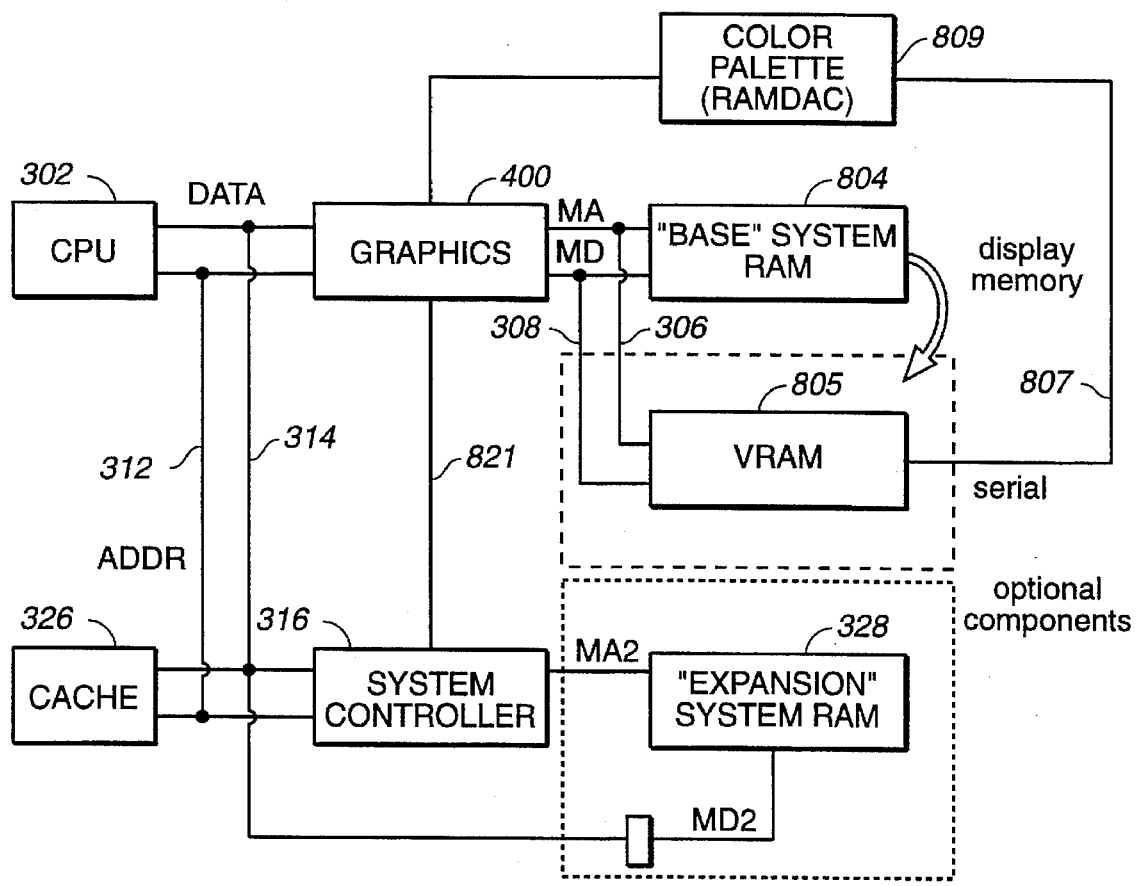
FIG._8

METHOD AND APPARATUS FOR ALLOCATING DISPLAY MEMORY AND MAIN MEMORY EMPLOYING ACCESS REQUEST ARBITRATION AND BUFFER CONTROL

This application is a continuation of application Ser. No. 08/158,979, filed Nov. 30, 1993, now abandoned.

BACKGROUND OF THE INVENTION

1. Field of the Invention

The present invention relates generally to computer architecture, and more particularly, to memory-sharing architectures which include graphics capabilities.

2. Background of the Invention

As the density of solid state memories increases, oversized memories are being wastefully used for purposes which optimally require specialized memory configurations (e.g., graphics refresh). One reason for this is that manufacturers attempt to produce memory sizes which will achieve a broad range of applicability and a high volume of production. The more popular, and thus more cost-effective memories, tend to be fabricated with square aspect ratios or with tall, thin aspect ratios (i.e., a large number of fixed length words) that are not readily suited to specialized uses.

Although uses which can exploit memories with these popular aspect ratios can be implemented in a relatively cost-effective manner, specialized uses which cannot exploit these aspect ratios can be proportionately more expensive to implement. The expense associated with implementing specialized uses assumes one of two forms: (1) the increased cost associated with purchasing a memory which does not conform to a readily available and widely used memory configuration; or (2) the increased cost associated with purchasing a readily available memory which is much larger than needed specialized use (e.g., a relatively square memory which must be tall enough to obtain a desired width, even though only a relatively small number of rows in the memory are needed for the purpose at hand).

The foregoing memory capacity problem is typically referred to as the memory granularity problem: expensive chips can be purchased and used efficiently or inexpensive memory chips can be purchased and used inefficiently. This problem is especially significant in computer systems which implement graphics functions, since these systems typically include a dedicated, high speed display memory. Specialized display memories are usually required because typically refresh function for the graphics display (e.g., for a 1280× 1024 display) consumes virtually all of the available bandwidth of a typical dynamic random access memory (DRAM).

To update a video line on a high resolution graphics display, a graphics refresh optimally requires a memory having a short, wide aspect ratio. Display memories used as frame buffers for high resolution graphics displays have therefore become an increasingly larger fraction of a system's overall cost due to the foregoing memory problem. For display memories, even a two megabit memory can be unnecessarily large, such that it cannot be effectively used. An exemplary display memory for a current high-end display of 1280×1024 pixels requires just over one megabyte of memory. Thus, almost one-half of the display memory remains unused.

For example, FIG. 1 illustrates a typical computer system 100 which includes graphics capabilities. The FIG. 1 computer system includes a central processing unit (CPU) 102, a graphics controller 104 and a system controller 106 all connected to a common bus 108 having a data portion 110 and an address portion 112.

The graphics controller 104 is connected to display memory 114 (e.g., random access memory, or RAM) by a memory bus having a memory address bus 116 and a memory data bus 118. RAMDAC 120 performs digital-to-analog conversion (DAC) of signals (e.g., analog RGB color signals) used to drive a graphics display.

The system controller is connected to system memory 122 by a separate memory address bus 124. A memory data bus 126 is connected directly between the common data bus 108 and the system memory. The system memory can also include a separate cache memory 128 connected to the common bus to provide a relatively high-speed portion for the system memory.

The graphics controller 104 mediates access of the CPU 102 to the display memory 114. For system memory transfers not involving direct memory access (DMA), the system controller 106 mediates access of the CPU 102 to system memory 122, and can include a cache controller for mediating CPU access to the cache memory 128.

However, the FIG. 1 configuration suffers significant drawbacks, including the granularity problem discussed above. The display memory 114 is limited to use in connection with the graphics controller and cannot be used for general system needs. Further, because separate memories are used for the main system and for the graphics memory, a higher number of pin counts render integration of the FIG. 1 computer system difficult. The use of separate controllers and memories for the main system and the graphics also results in significant duplication of bus interfaces, memory control and so forth, thus leading to increased cost. For example, the maximum memory required to handle worst case requirements for each of the system memory and the graphics memory must be separately satisfied, even though the computer system will likely never run an application that would require the maximum amount of graphics and main store memory simultaneously. In addition, transfers between the main memory and the graphics require that either the CPU or a DMA controller intervene, thus blocking use of the system bus.

Attempts have been made to alleviate the foregoing drawbacks of the FIG. 1 system by integrating system memory with display memory. However, these attempts have reduced duplication of control features at the expense of system performance. These attempts have not adequately addressed the granularity problem.

Some attempts have been made, particularly in the area of portable and laptop systems, to unify display memory and system memory. For example, one approach to integrated display memory and system memory is illustrated in FIG. 2. However, approaches such as that illustrated in FIG. 2 suffer significant drawbacks. For example, refreshing of the display via the graphics controller requires that cycles be stolen from the main memory, rendering performance unpredictable. Further, these approaches use a time-sliced arbitration mode for allocating specific time slots among the system controller and the graphics controller, such that overall system performance is further degraded.

In other words, overall performance of the FIG. 2 system is limited by the bandwidth of the single memory block, and the high demands of graphics refresh function alone introduce significant performance degradation. The allocation of memory bandwidth between display access and system access using fixed time-slots only adds to performance degradation. Because the time slots must be capable of handling the worst case requirements for each of the system memory and display memory subsystems, the worst possible memory allocation is forced to be the normal case.

Examples of computers using time-slice access to an integrated memory are the Commodore and the Amiga. The Apple II computer also used a single memory for system and display purposes. In addition, the recently-released Polar™ chip set of the present assignee, for portable and laptop systems, makes provision for integrated memory.

A different approach is described in a document entitled "64200 (Wingine™) High Performance 'Windows™ Engine'", available from Chips and Technologies, Inc. In one respect, Wingine is similar to the conventional computer architecture of FIG. 1 but with the addition of a separate path that enables the system controller to perform write operations to graphics memory. The graphics controller, meanwhile, performs screen refresh only. In another respect, Wingine may be viewed as a variation on previous integrated-memory architectures. Part of system memory is replaced with VRAM, thereby eliminating the bandwidth contention problem using a more expensive memory (VRAM is typically at least twice as expensive as DRAM). In the Wingine implementation, VRAM is not shared but is dedicated for use as graphics memory. Similarly, one version of the Alpha microprocessor sold by Digital Equipment Corporation reportedly has on board a memory controller that allows VRAM to be used to alleviate the bandwidth contention problem. The CPU performs a role analogous to that of a graphics controller, viewing the VRAM frame buffer as a special section of system RAM. As with Wingine, the VRAM is not shared.

Thus, traditional computer architectures can not efficiently integrate a single memory to accommodate the two different functions of display memory and system memory without significantly degrading system performance. What is needed, then, is a new computer architecture that allows display memory and system memory to be integrated while still achieving high system performance. Such an architecture should, desirably, allow for memory expansion and use with cache memory. Further, any such system should provide an upgrade path to existing and planned high performance memory chips, including VRAM, synchronous DRAM (SDRAM) and extended data out DRAM (EDODRAM).

SUMMARY OF THE INVENTION

The present invention, generally speaking, provides a low-cost, moderate performance small computer system by allowing a single sharable block of memory to be independently accessible as graphics or main store memory. Allocation of the memory is selected programmably, eliminating the need to have the maximum memory size for each block simultaneously. Performance penalties are minimized by dynamically allocating the memory bandwidth on demand rather than through fixed time slices.

A reallocatable memory subsystem enables transparent transfer of memory function of a lower-performance memory such as DRAM to occur in conjunction with a memory upgrade to a higher-performance memory such as VRAM, for example. More particularly, an apparatus for use in a computing machine including a CPU and a first memory includes memory slots, configuration circuitry for enabling allocation of a second memory as display memory and the first memory as main memory responsive to a second memory having a different performance level than the first memory being added to the memory slots; and means for allowing substantially independent access to the first memory and the second memory. Circuitry for allowing substantially independent access may include a memory controller including arbitration circuitry for arbitrating among a plurality of requests for access to the first and second memories, a first data path connected to the arbitration circuitry and including a first buffer store for facilitating exchange of data with the first memory, a second data path connected to the arbitration circuitry and including a second buffer store for facilitating exchange of data with the second memory, and control circuitry connected to the configuration circuitry and responsive to one or more signals applied to the apparatus, the signals including address, data and control signals, for causing at least some of the data signals to be applied to only one of the first and second data paths.

BRIEF DESCRIPTION OF THE DRAWINGS

The present invention can be further understood with reference to the following description and the appended drawings, wherein like elements are provided with the same reference numerals. In the drawings:

FIG. 1 is a system block diagram of a conventional computer system;

FIG. 2 is a block diagram of another conventional computer system;

FIG. 3 is a system block diagram of a base computer system in accordance with an exemplary embodiment of the present invention;

FIG. 4 is a more detailed block diagram of the graphics controller of FIG. 3;

FIG. 5 is a more detailed block diagram of the bus interface of FIG. 3;

FIG. 6 is a more detailed diagram of the bus status and configuration registers and decode block of FIG. 5;

FIG. 7 is a block diagram illustrating a remapping of memory in accordance with an exemplary embodiment of the present invention; and FIG. 8 is a system block diagram showing a system configuration in which the addition of VRAM has resulted in remapping of display memory to VRAM and reallocation of previous display memory to serve as system memory, in accordance with an exemplary embodiment of the present invention.

DETAILED DESCRIPTION OF THE PREFERRED EMBODIMENTS

FIG. 3 illustrates an exemplary embodiment of an apparatus for processing data in accordance with the present invention. The FIG. 3 apparatus, generally labeled 300, can be a computer system which includes a main CPU 302. The main CPU 302 can, for example, be any available microprocessor, such as any standard 486-based processor.

The FIG. 3 apparatus includes a means for storing data, generally represented as a memory 304. In accordance with the present invention, the dam storing means 304 includes a system memory portion (e.g., random access memory, or RAM) and a display memory portion (e.g., RAM) addressed via common address lines 306 labeled MA. The display (e.g., graphics) memory portion can include an address space from an address 0 to an address B-1) for a data storing means having B bytes. Further, the display memory portion and the system memory portion read and write data via common memory data lines 308 labeled MD.

The FIG. 3 apparatus includes means for controlling a display operation of the FIG. 3 system independently of the system controller. The display controlling means is generally represented as a display (e.g., graphics) controller 400. The graphics controller 400 is connected to the CPU 302 via CPU address lines 310 and CPU data lines 312 of a main CPU bus 314. The graphics controller 400 controls access to the graphics memory portion of the data storing means.

The FIG. 3 computer system further includes means for controlling access to the system memory portion of the data storing means 304. The means for controlling access to the system memory portion is generally represented as a system controller 316 which is interfaced to the CPU 302 and the graphics controller 400 via the main CPU bus 314. Although the graphics controller and the system controller are indicated as separate blocks, in a physical implementation, they may reside on the same integrated circuit chip or on separate chips.

The signal lines 318, 322 and 324 permit the FIG. 3 computer system to provide cache support for the system memory via the graphics controller 400, where the cache controller is included within the system controller. In accordance with exemplary embodiments, a cache memory 326 can be included for this purpose. Memory reads and writes can be performed to the data storing means in both burst and non-burst modes.

Generally speaking, the signal line 322 labeled DRAM# indicates to the graphics controller when an addressable location exists within the shared memory and is not in the L2 cache. The signal line 324 labeled ERDY# is an early ready signal from the graphics controller to the system controller to verify that valid data has been read from the shared memory and will be valid for reading by the CPU in a predetermined time.

More particularly, typical personal computer systems feature an on-chip level-one (L1) cache of, for example, 8 kilo bytes within the CPU. Any external cache therefore functions as a level-two (L2) cache; i.e., data sought by the CPU is first sought in the L1 cache, then sought in the L2 cache, if necessary, and then sought in system memory if the data has not been found. In the conventional computer architecture of FIG. 1, since system memory is located in a single system memory 122, a cache controller included within the system controller 106 can function independently of the graphics controller 104.

In the system of FIG. 3, on the other hand, system memory is located in the shared data storing means 304. However, in accordance with exemplary embodiments, existing cache control capabilities of the system controller 316 can still be used by establishing communication between the graphics controller 400 and the system controller 316. Further, in the system of FIG. 3, system memory is located in both the data storing means represented by memory 304, and an optional expansion memory 328. A failure to detect data in the L2 cache may therefore result in the data being found in the shared memory or in expansion memory. Again, communication between the graphics controller 400 and the system controller 316 can handle this situation.

FIG. 3 illustrates the manner in which efficient L2 cache memory support is provided for a system wherein a system controller 316 has an integrated L2 cache controller and a graphics controller, and a shared memory system. L2 cache support is provided for all system memory, regardless of the controller to which it is connected. Such support requires coordination between the system controller (with its integrated L2 cache controller) and the graphics controller.

In a 486-like or VL-Bus-based personal computer, L2 cache support may be provided using the existing backoff (i.e., BOFF#) CPU bus signal and the two new signals referred to herein as the DRAM# and ERDY# signals. DRAM# is driven by the system controller and ERDY# is driven by the graphics controller.

The system controller 316 monitors memory cycles and notifies the graphics controller when to ignore a particular memory cycle by deasserting the DRAM# on the signal line 322 at a predetermined time in the memory cycle. A system controller instructs the graphics controller to ignore a particular memory cycle when the addressable location is to a location other than the graphics portion of the data storing means (e.g., if the addressable location is to an ISA or PCI bus of the system, or if it's a location within the cache, or in another separate memory and so forth).

The graphics controller 400 also monitors memory cycles and begins a memory cycle when an addressable location is within the range of addressable locations for which the graphics controller is enabled to respond. In operation, the graphics controller tests the DRAM# on the signal line 322 at a predetermined time to determine whether it should respond to a current memory cycle. If the DRAM# signal on the signal line 322 has been deasserted by the system controller (i.e., false) the graphics controller 400 aborts the current memory cycle.

On the contrary, if the DRAM# on the signal line 322 has been asserted by the system controller (i.e., tests true), the memory cycle continues and the graphics controller 400 asserts the signal ERDY# on the signal line 324 to indicate to the system controller that the graphics controller is ready to read data. In this sense, the ERDY# signal represents an early ready signal which occurs a fixed number of clock cycles before data which is to be read becomes valid. In this instance, the cache controller 320 integrated within the system controller 316 senses the ERDY# signal on signal line 322 and initiates a writing of data into the cache 326.

The graphics controller can also be programmed to drive ERDY# at the end of a memory read cycle to signal to the system controller if a parity error occurred during the read.

Write-backs, for read-miss-dirty cycles and the like, are also supported using the BOFF# CPU bus signal. When write-back is required in response to a read request, the system controller asserts BOFF# (backoff), causing the CPU to abort the read cycle. Meanwhile, the graphics controller will have already started a memory read if the real address was within its address space.

The graphics controller also monitors BOFF# and, when it is asserted, is alerted that the read has been aborted. If the write-back is to memory outside the graphics controller's address space, the graphics controller may allow the read to continue, assuming that by the time the read has completed, the write-back may also be done, reducing latency time. The write-back may also be to memory in the graphics controller's address space. In this case, the system controller keeps BOFF# asserted and "masters" the write-back on the CPU bus by driving the bus just as the CPU would do if it were initiating the write. After the write-back has been completed, BOFF# is deasserted, and the CPU restarts the read operation.

This approach can be extended to provide L2 cache support for memory on other devices connected to the CPU bus. ERDY# may be driven by multiple sources in a "open-drain" configuration. Multiple DRAM# lines can be used or encoded together to signal to multiple devices.

In accordance with exemplary embodiments, the graphics controller 400 can include means for reallocating addressable locations of the data storing means 304 as display memory which is accessible by the graphics controller 400, or as system memory which is independently accessible by the system controller 316. Further, the exemplary graphics controller 400 can include means for dynamically controlling access of the system controller and the display controlling means to the display memory portion and the system memory portion, respectively. The reallocating means and access controlling means are generally represented as block 500, included within the graphics controller 400.

The FIG. 3 computer system can provide significant advantages. For example, the FIG. 3 system represents a scalable architecture which can be configured for various price/performance alternatives. The FIG. 3 system represents a relatively low-cost system which includes a single bank of shared memory (represented by the data storing means 304) which can be concurrently used, and dynamically reconfigured for both graphics and system functions. Unlike previous shared memory systems, the allocation of memory bandwidth between display access and system access is not fixed; rather, memory bandwidth is dynamically allocated on demand between display access and system access.

Exemplary embodiments of the present invention, such as that illustrated in FIG. 3, can achieve enhanced performance by adding a second bank of memory represented by the expansion memory means 328. In accordance with the exemplary embodiment wherein expansion memory is used, B bytes of memory in the shared memory can be allocated to system use, with an address space from address locations zero through address (B−1). The expansion memory can be considered to contain E bytes of expansion system memory (e.g., RAM). In an exemplary embodiment, the E bytes can be addressed beginning with starting address B and ending with address (E+B−1).

In such an alternate embodiment, the data storing means 304 can continue to be shared between the graphics controller and the system controller. However, in accordance with alternate embodiments, a relatively high level of performance can be achieved by dedicating all of the data storing means 304 to graphics, reserving only the relatively fast portion of the data storing means or the expansion memory means for system use.

By the add on of expansion memory via an independent, separately controlled memory bus, system performance can be further enhanced, while using the same cache controller integrated in the system controller. With the addition of a simple memory interface block, concurrent accesses can occur to both the data storing means 304 and the expansion memory means 328. In this case, performance can be further improved. For example, the possibility of parallel main memory accesses to two possible memory paths can result in increased performance by effectively overlapping accesses.

Thus, exemplary embodiments of the present invention provide significant advantages. By providing a single sharable block of memory that is independently accessible as graphics memory or as main store memory, improved performance at relatively low-cost can be realized. By rendering allocation of the shared memory programmably selectable, any need to have maximum memory size for each of the independent graphics and main memory functions can be eliminated. Further, memory bandwidth can be dynamically allocated on demand rather than via fixed time slices, further improving performance.

Referring to FIG. 4, the graphics controller 400 interfaces to the CPU bus 314 via the reallocating means represented as bus interface 402. The graphics controller interfaces to the data storing means 304 via the access controlling means, represented as a memory interface 408.

Commands and data from the FIG. 3 CPU 302 are distributed to various logic blocks of the graphics controller 400 on two main buses represented by a display access bus 405 and a system access bus 407, indicated by thick, heavy lines in FIG. 4. The system access bus 407 is connected to the memory interface 408.

The display access bus 405 is connected to various graphics controller logic blocks which are responsive to commands or programming instructions from the CPU. These logic blocks include a CRT controller (CRTC) 404, a sequencer (SEQ) 410, a RAMDAC interface 412, a clock synthesizer interface 418, an attribute controller (ATT) 422, a hardware cursor (HWC) 428, a graphics accelerator (Accel) 414 and pixel logic 416. In other implementations, other logic blocks may be included or ones of the foregoing logic block may not be included.

The CRTC 404 provides vertical and horizontal sync signals to a raster-scan CRT display. The sequencer 410 provides basic timing control for the CRTC 404 and the attribute controller 422. The RAMDAC interface 412 provides for programming of a RAMDAC (i.e., external or integrated) such as the RAMDAC of FIG. 1. The RAMDAC is a combination random access memory and digital-to-analog converter that functions as a color palette which drives the CRT. The RAMDAC 120 in FIG. 1 can be a look-up table used to convert the data associated with a pixel in the display memory into a color (e.g., RGB analog output).

The attribute controller 422 provides processing for alphanumeric and graphics modes. The hardware cursor 428 provides for display of any of a number of user-definable cursors. The accelerator 414 and pixel logic 416 assist the host CPU in graphics-related operations. The pixel logic 416 of FIG. 4 may also function as a pixel cache.

The clock synthesizer interface 418 provides for programming of a programmable clock synthesizer. Operation of the clock synthesizer interface, along with the other various graphics logic blocks in FIG. 3, is well-known to one of ordinary skill in the art.

The memory interface 408, which functions as the access controlling means, arbitrates memory access between a number of different entities: the system access bus 407, the pixel logic 416, the display refresh logic 426, and the hardware cursor 428. Priority between these entities can vary according to system activity and the degree to which various buffers are full or empty. The priority scheme takes into account whether a particular access relates to a "mission-critical" function, so as to prevent such functions from being disrupted. For example, display refresh can be classified as a mission-critical function.

The exemplary FIG. 3 system allocates a portion of the graphics controller's memory to the CPU for system use such that a single shared memory can be used to concurrently implement display functions and system memory functions. In accordance with alternate embodiments of the present invention, latency times for both graphics and system cycles can be further improved by providing separate queues for graphics and system accesses, with the separate queues being serviced in parallel, independently of each other.

More particularly, FIG. 5 shows the reallocating means represented by the bus interface 500 of FIG. 4 in greater detail. As illustrated in FIG. 5, a bus state machine 502 connects to the CPU bus and executes bus cycles involving the graphics controller. Commands or data from the CPU are latched in a command latch 504. The command latch is connected to both a graphics queue 506 and a system queue 508. The graphics queue 506 establishes bi-directional operation using two separate, uni-directional queues: one queue that stores commands from the CPU and outputs them from the bus interface for use by the graphics controller, and one queue that stores data of the graphics controller and outputs it to the CPU. Likewise, the system queue 508 is a bi-directional queue composed of two unidirectional queues. The output buses of the graphics queue and the system queue are therefore bi-directional and are connected to an output latch 510 in order to drive data from the graphics controller to the CPU.

Separate memory and input/output (I/O) address ranges are defined for each queue such that the graphics and system queues are independently accessible. The graphics queue 506 and the system queue 508 are controlled by a graphics queue state machine 512 and a system queue state machine 514, respectively. These state machines are in turn controlled by the bus state machine 502.

A bus status/configuration registers/address decode block 520 is connected to the bus state machine 502. Further, block 520 is connected with an output multiplexer 516 of the output latch, and an output multiplexer ("mux") 518 of the command latch.

Bus status registers of block 520 contain information regarding the state of the graphics controller and the amount of available space in the graphics and system queues. The bus status registers may be read directly through the output mux 516 without putting a read command into either queue. Configuration registers of block 520 are written to from the bus state machine 502 and are used to select modes of operation in addition to those provided in a typical video graphics array (VGA) implementation.

In accordance with exemplary embodiments, programming flexibility can be improved by providing remapping registers which allow the CPU to reallocate the addresses to which the graphics controller responds. Address decoding is programmable, such that the graphics controller responds to a CPU command if the command is to an address within the graphics controller's designated address space.

Outside the bus interface 402 of FIG. 4, the graphics controller assumes that registers and memory are always at fixed addresses. Within the bus interface, address decode logic included in block 520 allows a register/memory location to be reallocated (i.e., remapped) from an original address to a new address more suitable to the CPU. This address decode logic therefore maps the new CPU address back to its original address.

An exemplary sequence would be as follows. The CPU issues a read command of a particular address. The graphics controller's address decode logic included in block 520 determines that the address is within the graphics controller's range, but that the desired register/memory location has been remapped from its original address to a new address more suitable to the CPU. In this case, the address decode logic in block 520 maps the CPU address back to the original address and latches that address into the appropriate queue via the mux 518. Below the queues 506 and 508, registers and memory are always at fixed addresses, simplifying decoding of the graphics and system queue buses. In addition to the graphics queue 506 and the system queue 508, a separate latch (one-stage queue) 522 can be provided for the hardware cursor.

Referring to FIG. 6, the bus status/configuration registers/address decode block 520 of FIG. 5 is illustrated in greater detail. As shown in FIG. 6, the block 520 includes address decode logic 602, configuration registers 604 and status registers 606. The address decode logic 602 examines the CPU control lines that define whether the command is to memory or I/O and is a read or a write operation. The address decode logic 602 further compares the CPU address on the address bus to addresses programmed for various logic groups. If a match is found, the appropriate select line is asserted. Separate lines out of the address decode logic signal if the CPU address is within the address space of one of the following exemplary groups: VGA mode I/O, VGA mode frame buffer, Windows mode registers, Windows mode frame buffer, system memory, configuration registers, or the status registers address space (which is within the configuration registers address space).

The configuration registers 604 are initialized to some predetermined value at power-on reset. The configuration registers remap some of the address spaces within the graphics controller. This remapping allows software to access particular register or logic at a different address than to which it was initialized. Additional capability can be added to inhibit the graphics controller from responding to accesses of particular logic or memory. This may be done in various ways, for example, explicitly via enable/disable bits in a register and implicitly by programming the low and high address boundaries for a group to be the same. The configuration registers can be read by the CPU via a port 608.

The status registers 606 are read only. They contain information such as queue status (how full the queues are), what the accelerator is doing, what errors have occurred, and so forth. Certain bits of the status registers may be cleared by being read. The CPU reads the status registers directly without having to go through the graphics or system queues.

FIG. 7 illustrates a reallocation of addressable locations in memory when the expansion memory means 328 of FIG. 3 is used. The reallocation of FIG. 7 ensures that addressable locations of any expansion memory are added to the bottom of available system memory. This ensures that expansion memory will always be accessed first by the CPU to accommodate system upgrades to high-speed memory.

The present reallocatable memory subsystem enables transparent transfer of DRAM function to occur in conjunction with a memory upgrade to VRAM, for example. Existing systems typically allow upgrade of DRAM to faster DRAM or of DRAM to VRAM. Such systems waste any non-removable (i.e., motherboard-soldered) DRAM in the system as the new memory replaces the old. This waste is unavoidable, because the function of DRAM in such systems is fixed and cannot be transferred when the upgrade takes place.

Memory utilization is maximized (and total system cost minimized) by enabling transfer of DRAM function from graphics to main memory when a VRAM upgrade is added to the system.

Referring to FIG. 8, the illustrated system is substantially identical to that of FIG. 3 with the exception that a VRAM 805 has been added to the system and is connected to the graphics controller 400 by the memory address bus 306 and the memory data bus 308. When the more expensive VRAM is added to achieve higher performance, the function of display memory is migrated from the DRAM 804 (used in a basic system configuration as shared memory to provide adequate system performance at low cost) to the VRAM 805. The VRAM therefore takes over the function originally provided by the DRAM. The DRAM is transferred to a new function (e.g., system memory) and is still available to the system. No memory is wasted or lost as normally is the case. Graphics (and system) performance is significantly improved because of the additional bandwidth and feature set available from the VRAM 805. In particular, the VRAM has a serial port 807 that connects directly to the RAMDAC 809. The normal display refresh path described in conjunction with FIG. 4 is therefore inactivated.

In a preferred embodiment, two bank select lines are dedicated to VRAM. At power-on, BIOS checks to see what memory is present in the system. If a memory device responds to these dedicated bank select signals, it is assumed to be VRAM. BIOS or a device driver then configures the graphics controller accordingly. In a preferred embodiment, 1M of VRAM or 2M of VRAM may be added to the system. An analogous remapping as that shown in FIG. 7 is performed to map display memory to the VRAM 805 and to map a portion of the system memory address space to the DRAM 804.

The memory interface 408 of FIG. 4 distinguishes between DRAM and VRAM accesses to execute the correct physical cycles for the memory involved in a particular transfer.

Although an upgrade from DRAM to VRAM has been described in conjunction with an exemplary embodiment, the same mechanism may be used to upgrade to any of a number of existing and planned high performance memory chips, including VRAM, SDRAM and EDODRAM.

In summary, by integrating graphics memory and system memory, the present architecture allows system cost to be significantly reduced while providing an upgrade path. By enabling transparent transfer of memory function during upgrade, no memory is wasted or lost as is normally the case. High system performance is furthered by providing a bus interface with separate graphics and system paths.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. For use in a computing apparatus including a CPU and a first memory allocated as display memory, the apparatus comprising:

memory slots;

configuration means responsive to a second memory having a different performance level than said first memory being added to said memory slots for thereafter, at power-up, automatically allocating said second memory as display memory and said first memory as main memory; and means for allowing substantially independent access to said first memory and said second memory.

2. The apparatus of claim 1 further comprising:

memory controller means for controlling access to said first and second memories, including arbitration means for arbitrating among a plurality of requests for access to said first and second memories;

first data path means connected to said arbitration means and including first buffer storage means for facilitating exchange of data with said first memory;

second data path means connected to said arbitration means and including second buffer storage means for facilitating exchange of data with said second memory; and control means connected to said configuration means and responsive to at least one of a plurality of signals applied to said apparatus, said signals including address, data and control signals, for causing a plurality of signal from among said data signals to be applied to only one of said first and second data path means.

3. The apparatus of claim 2 wherein said control means comprises a bus controller.

4. The apparatus of claim 3 wherein said first buffer storage means comprises a system queue.

5. The apparatus of claim 4 wherein said first buffer storage means further comprises a system queue controller connected to said system queue and to said bus controller.

6. A method of increasing the performance of a computing apparatus including a CPU, memory slots, and a first memory allocated as display memory, comprising the steps of:

adding to said memory slots a second memory having a different performance level than said first memory;

thereafter, at power-up, automatically allocating said second memory as display memory only and changing allocation of said first memory such that said first memory is allocated as main memory only; and allowing substantially independent access to said first memory and said second memory.

\* \* \* \* \*